US008238878B2

(12) United States Patent
Kang et al.

(10) Patent No.: US 8,238,878 B2
(45) Date of Patent: Aug. 7, 2012

(54) IMAGE SECURITY METHOD AND DISPLAY METHOD OF PORTABLE TERMINAL

(75) Inventors: Sang-Eun Kang, Gunpo-si (KR); Young-Keun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 411 days.

(21) Appl. No.: 12/617,888

(22) Filed: Nov. 13, 2009

(65) Prior Publication Data
US 2010/0124903 A1 May 20, 2010

(30) Foreign Application Priority Data

Nov. 14, 2008 (KR) ........................ 10-2008-0113326

(51) Int. Cl.
*H04M 1/66* (2006.01)

(52) U.S. Cl. ..................... 455/411; 455/558; 455/552.1; 455/566; 455/550.1; 455/556.1

(58) Field of Classification Search .......... 455/410–411, 455/558, 552.1, 566; 709/203
See application file for complete search history.

(56) References Cited

U.S. PATENT DOCUMENTS

| 5,537,474 | A | * | 7/1996 | Brown et al. ................. 380/248 |
|---|---|---|---|---|
| 7,509,347 | B2 | * | 3/2009 | Chambers ............................. 1/1 |
| 7,706,837 | B2 | * | 4/2010 | Ladouceur ................. 455/556.1 |
| 7,706,839 | B2 | * | 4/2010 | Ueno ........................... 455/558 |
| 7,933,611 | B2 | * | 4/2011 | Bocking et al. ............ 455/456.4 |
| 8,103,309 | B2 | * | 1/2012 | Lee .............................. 455/558 |
| 8,126,507 | B2 | * | 2/2012 | Cofta .......................... 455/558 |
| 2006/0069922 | A1 | * | 3/2006 | Jelinek et al. ................ 713/186 |
| 2007/0072581 | A1 | * | 3/2007 | Aerrabotu ................. 455/404.1 |
| 2007/0282908 | A1 | * | 12/2007 | Van der Meulen et al. ........................ 707/104.1 |
| 2010/0211574 | A1 | * | 8/2010 | Mislan et al. ................ 707/748 |
| 2010/0323730 | A1 | * | 12/2010 | Karmarkar ................... 455/466 |
| 2011/0081951 | A1 | * | 4/2011 | Hwang ......................... 455/558 |
| 2012/0093075 | A1 | * | 4/2012 | Derkach et al. .............. 370/328 |

* cited by examiner

*Primary Examiner* — Sharad Rampuria
(74) *Attorney, Agent, or Firm* — Jefferson IP Law, LLP

(57) ABSTRACT

An image security method and display method of a portable terminal are provided. The image security method includes photographing an image through a camera, storing the image, and storing Subscriber Identity Module (SIM) information of the portable terminal in EXchangeable Image File (EXIF) information of the image. The image display play method includes executing an image view, comparing Subscriber Identity Module (SIM) information of the portable terminal with SIM information within EXchangeable Image File (EXIF) information of an image stored in the portable terminal, and displaying an image depending on the comparison result.

20 Claims, 5 Drawing Sheets

IMAGE SECURITY METHOD AND DISPLAY METHOD OF PORTABLE TERMINAL

PRIORITY

This application claims the benefit under 35 U.S.C. §119(a) of a Korean patent application filed in the Korean Intellectual Property Office on Nov. 14, 2008 and assigned Serial No. 10-2008-0113326, the entire disclosure of which is hereby incorporated by reference.

BACKGROUND OF THE INVENTION

1. Field of the Invention

The present invention relates to an image security method and display method of a portable terminal. More particularly, the present invention relates to an image security method and display method for inserting Subscriber Identity Module (SIM) information into an EXchangeable Image File (EXIF) of an image of a portable terminal.

2. Description of the Related Art

With high sensitivity, miniaturization, and reduction in weight of electronic parts, a portable terminal becomes gradually smaller in size, and a function is diversified according to the desire of a consumer. Accordingly, further to a call function of the portable terminal, a game function, an Internet search function, an electronic mail (e-mail) reception/transmission function, a payment function, etc. have become popular. A portable terminal additionally having a camera function of photographing shapes of things with an installed camera and an image transmission function of transmitting images of shapes of things photographed by a camera to a computer or other portable terminals becomes commercialized.

In recent years, a dual Subscriber Identity Module (SIM) terminal using a combination of two SIMs and a multimode portable terminal using two or more communication networks have become available in the market. For example, a dual mode portable terminal supporting a Code Division Multiple Access (CDMA) communication network and a Global System for Mobile communication (GSM) communication network has different SIMs for the respective communication networks. Thus, the dual mode portable terminal periodically requests and receives preambles and/or pilot channel signals from Base Stations (BSs) of the CDMA and GSM communication networks and measures channel states (e.g., a Received Signal Strength Indicator (RSSI), a Carrier to Interface Noise Ratio (CINR), a Quality of Service (QoS), etc.). Therefore, the dual mode portable terminal can simultaneously support the two communication networks even in an idle mode.

Specifically, the dual SIM terminal and the dual mode portable terminal may be used for a specific purpose such as an enterprise purpose or a personal purpose depending on a SIM.

SUMMARY OF THE INVENTION

An aspect of the present invention is to address at least the above-mentioned problems and/or disadvantages and to provide at least the advantages described below. Accordingly, an aspect of the present invention is to provide an image security method and image display method of a portable terminal.

The above aspects are achieved by providing an image security method and display method of a portable terminal.

In accordance with an aspect of the present invention, an image security method of a portable terminal is provided. The method includes photographing an image through a camera, storing the image, and storing Subscriber Identity Module (SIM) information of the portable terminal in EXchangeable Image File (EXIF) information of the image.

In accordance with another aspect of the present invention, an image display method of a portable terminal is provided. The method includes executing an image view, sequentially comparing SIM information of the portable terminal with SIM information within EXIF information of an image stored in the portable terminal, and displaying an image depending on the comparison result.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In a description of exemplary embodiments of the present invention, a portable terminal can be a conventional portable terminal having only one Subscriber Identity Module (SIM) at a certain time, a dual SIM portable terminal using at least two different SIMs, and a dual mode portable terminal simultaneously accessing communication networks following at least two communication schemes or simultaneously accessing communication networks following at least two service providers. However, in a detailed description of exemplary embodiments of the present invention, a dual mode portable terminal is described, for example.

Figure 1:
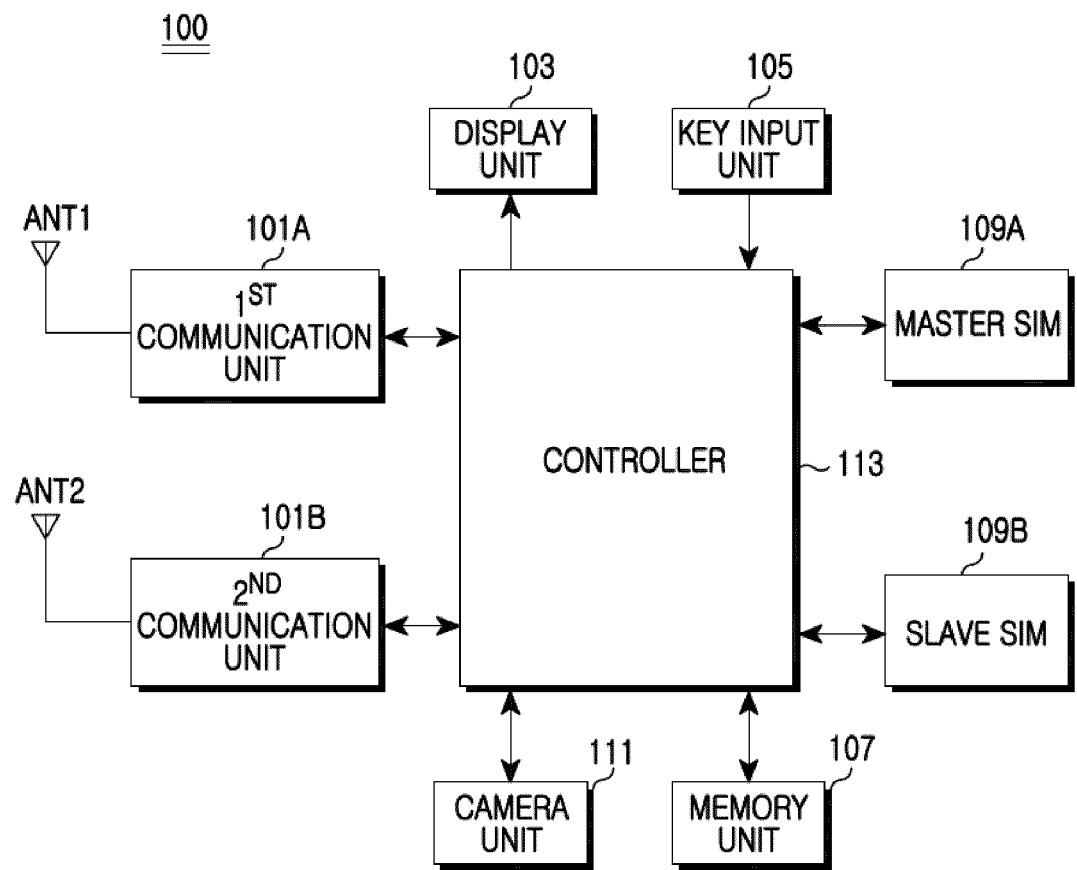
FIG. 1 is a block diagram illustrating a schematic construction of a portable terminal according to an exemplary embodiment of the present invention.

FIG. 1 is a block diagram illustrating a schematic construction of a portable terminal according to an exemplary embodiment of the present invention.

Referring to FIG. 1, the portable terminal includes a first communication unit 101A, a second communication unit 101B, a display unit 103, a key input unit 105, a memory unit 107, a master SIM 109A, a slave SIM 109B, a camera unit 111, and a controller 113.

The first and second communication units 101A and 101B are Radio Frequency (RF) units for performing a wireless communication function. The first and second communication units 101A and 101B each include an RF transmitter for up-converting and amplifying a frequency of a transmitted signal, an RF receiver for low-noise-amplifying a received signal and down-converting a frequency, antennas ANT1 and ANT2 for transmitting/receiving an electrical wave, and the like.

The display unit 103 visually displays various kinds of information about a state and operation of the portable terminal. The display unit 103 displays various kinds of screens depending on image security and display according to an exemplary embodiment of the present invention. More particularly, if SIM information of the portable terminal and SIM information within an EXIF of an image are different from each other, the display unit 103 displays the indistinct or mosaic image.

The display unit 103 can be a variety of display devices such as a Liquid Crystal Display (LCD), an Organic Light Emitting Diode (OLED), a Plasma Display Panel (PDP), and the like.

The key input unit 105 receives an input of a user's manipulation signal for controlling overall operations of the portable terminal. According to an exemplary embodiment of the present invention, the key input unit 105 includes a plurality of function keys such as a menu key, a select key, a photograph key, etc. corresponding to several functions of the portable terminal, and provides key input data corresponding to a key pressed by a user to the controller 113.

The memory unit 107 stores a program and information necessary for an operation of the portable terminal. According to an exemplary embodiment of the present invention, the memory unit 107 stores an image file and, more particularly, stores enabled SIM information of the portable terminal in EXIF information of an image.

The master SIM 109A and the slave SIM 109B, which are dual mode smart cards, include subscriber information and identity information used for each communication. The master SIM 109A and the slave SIM 109B can include record information, etc. on wireless communication.

Information on the master SIM 109A and the slave SIM 109B is managed by a file system that includes a Master File (MF), a Dedicated File (DF), and an Elementary File (EF). The master SIM 109A is a SIM which is presently enabled in the portable terminal and information about which is displayed on the display unit 103. The master SIM 109A is changeable with the slave SIM 109B depending on an input of the menu key or the key input unit 105.

The camera unit 111 includes a camera sensor and a signal processor. The camera sensor photographs an image and converts a photographed optical signal into an electrical signal. The signal processor converts an analog image signal photographed by the camera sensor into digital data.

The controller 113 performs a function of controlling general operations of the portable terminal. The controller 113 performs a control of storing an image photographed by the camera unit 111 in the memory unit 107 according to an exemplary embodiment of the present invention. The controller 113 detects the information on the master SIM 109A and the slave SIM 109B, and compares the detected SIM information with SIM information within an EXIF of the image.

Figure 2:
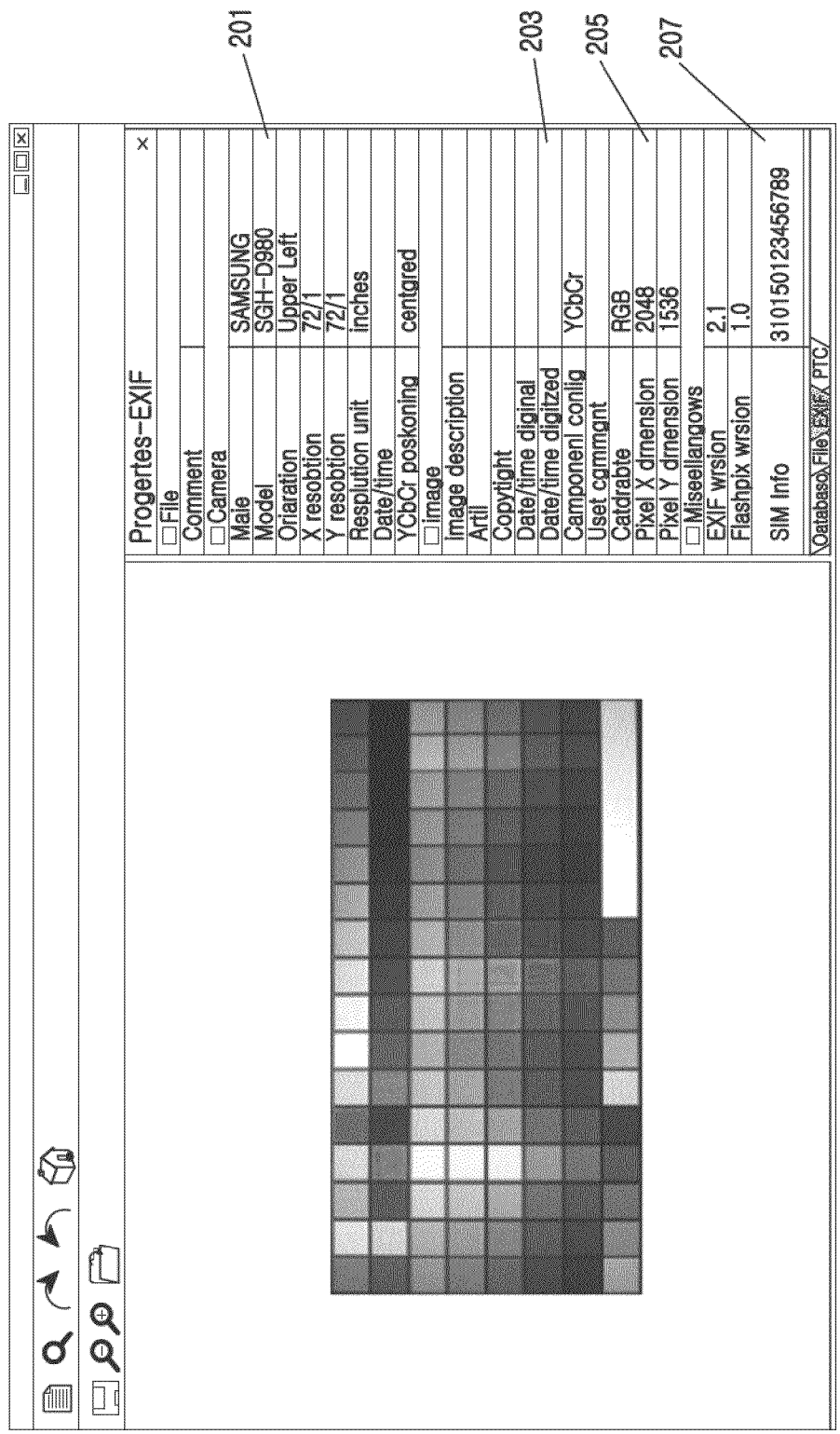
FIG. 2 is a diagram illustrating EXchangeable Image File (EXIF) information according to an exemplary embodiment of the present invention.
Figure 3:
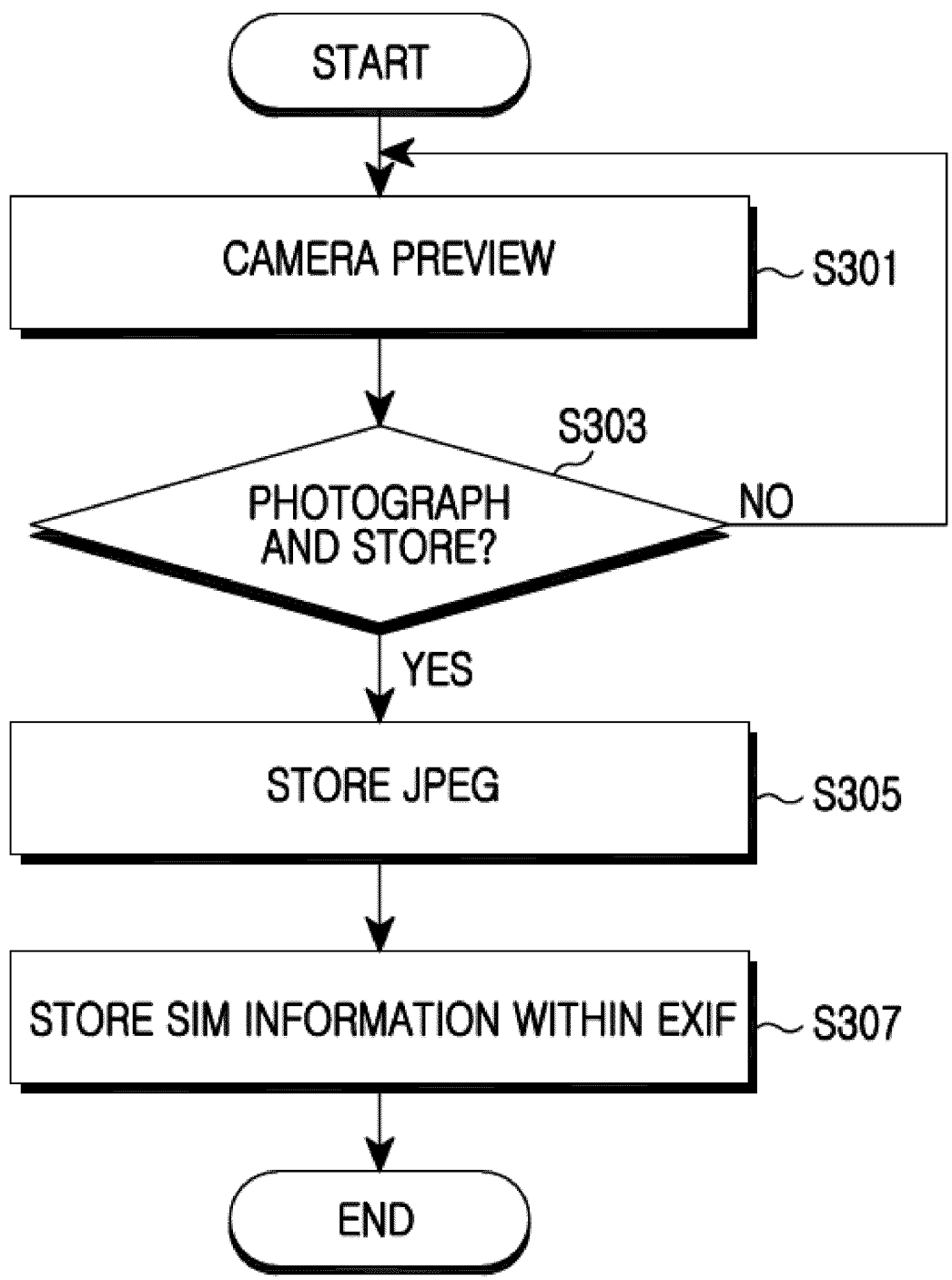
FIG. 3 is a flow diagram illustrating a procedure of storing information for image security of a portable terminal according to an exemplary embodiment of the present invention.

FIG. 2 is a diagram illustrating EXchangeable Image File (EXIF) information of an image according to an exemplary embodiment of the present invention. FIG. 3 is a flow diagram illustrating a procedure of storing information for image security of a portable terminal according to an exemplary embodiment of the present invention.

Referring to FIGS. 2 and 3, in step S301, the portable terminal controls a camera unit 111 and displays a camera preview screen on a display unit 103. Here, the displaying of the camera preview screen is possible through a selection of a menu in an idle screen of the portable terminal, and is also possible through a hot key of a key input unit 105 in the idle screen of the portable terminal.

If the preview screen is displayed, in step S303, the portable terminal determines if a photographing and storing event occurs. If it is determined that the photographing and storing event does not occur in step S303, the portable terminal returns to step S301 and continues displaying the camera preview screen. If it is determined that the photographing and storing event occurs in step S303, the portable terminal proceeds to step S305 and stores an image of a time when the photographing and storing event occurs, in a Joint Photographic Experts Group (JPEG) form.

JPEG is a technology standard for compressing image information such as a photograph for communication. JPEG is advantageous in that, despite its loss compression scheme, a picture quality is good compared to a compression rate, and a variety of applications are possible. Accordingly, JPEG is now used in several fields of a Web, a digital camera, a portable terminal, etc., and is used for image storage according to an exemplary embodiment of the present invention. However, the invention is not so limited and an image compression of a type other than JPEG is also possible in the present invention.

If completing to store the compressed image, in step S307, the portable terminal stores SIM information within an EXIF of the compressed image. In general, the compressed image has supplementary information on the image together with information on the image in accordance with EXIF policy. For example, when a JPEG image is a still image photographed by a camera, the image has photographing option information such as device information 201 on the camera photographing the image, a photographing date 203, an image size 205, etc. In an exemplary embodiment of the present invention, the portable terminal additionally stores its SIM information in the photographing option information of an EXIF. That is, the portable terminal extracts information stored in a SIM of the portable terminal, and stores the extracted information in a specific region 207 of the EXIF.

Among the information stored in the SIM, the extracted information represents inherent information for distinguishing from a different SIM. Table 1 below is to describe the SIM information.

TABLE 1

| SIM data | Details | |
|---|---|---|
| IMSI (International Mobile Subscriber Identity) | MCC (Mobile Country Code) MNC (Mobile Network Code) MSIN (Mobile Station Identification Number) | |
| ICCID (Integrated Circuit Card ID) | Issuer Identification Number | MII (Major Industry Identifier) Country Code Issuer Identifier |
| | Individual Account Identification | Individual Account Identification Number Parity Check Digit |
| Authentication key (Ki) | A 128-bit value used in authenticating the SIMs on the mobile | |
| Location area identity | Network state information | |
| SMS messages and contacts | Stored a number of SMS messages and phone book contacts | |
| SSN Digits | SIM serial number | |
| Universal Subscriber Identity Module | An application for UMTS mobile telephony running on a UICC smart card which is inserted in a 3G mobile phone | |

Referring to Table 1, the inherent information for distinguishing from a different SIM among the information stored in the SIM can be an International Mobile Subscriber Identification (IMSI), an Integrated Circuit Card IDentification (ICCID), SIM Serial Number (SSN) Digits, etc. In an exemplary embodiment of the present invention, the IMSI is inherent information for distinguishing from a different SIM. The IMSI value is an inherent number of a SIM. In the IMSI value, the first three numerals represent a Mobile Country Code (MCC), the second three numerals represent a Mobile Network Code (MNC), and the remaining numerals represent a Mobile Station Identification Number (MSIN). For example, an IMSI value 207 of FIG. 2 is described. An MCC of '310' represents a country of USA. An MNC of '150' represents a network called AT&T within USA. An MSN of '123456789' represents a telephone number of '123456789' using the AT&T network within USA.

In an alternative exemplary implementation, the extracting of the information stored in the SIM of the portable terminal is also possible in steps S301 and S305 as well as in step S307.

More particularly, according to an exemplary embodiment of the present invention, because the portable terminal, a dual mode portable terminal, can simultaneously use at least two SIMs, the SIM information stored in the EXIF in step S307 is information on a master SIM 109A enabled.

If completing to store the SIM information within the EXIF in step S307, the portable terminal terminates the procedure of storing the information for the image security of the portable terminal according to an exemplary embodiment of the present invention.

Figure 4:
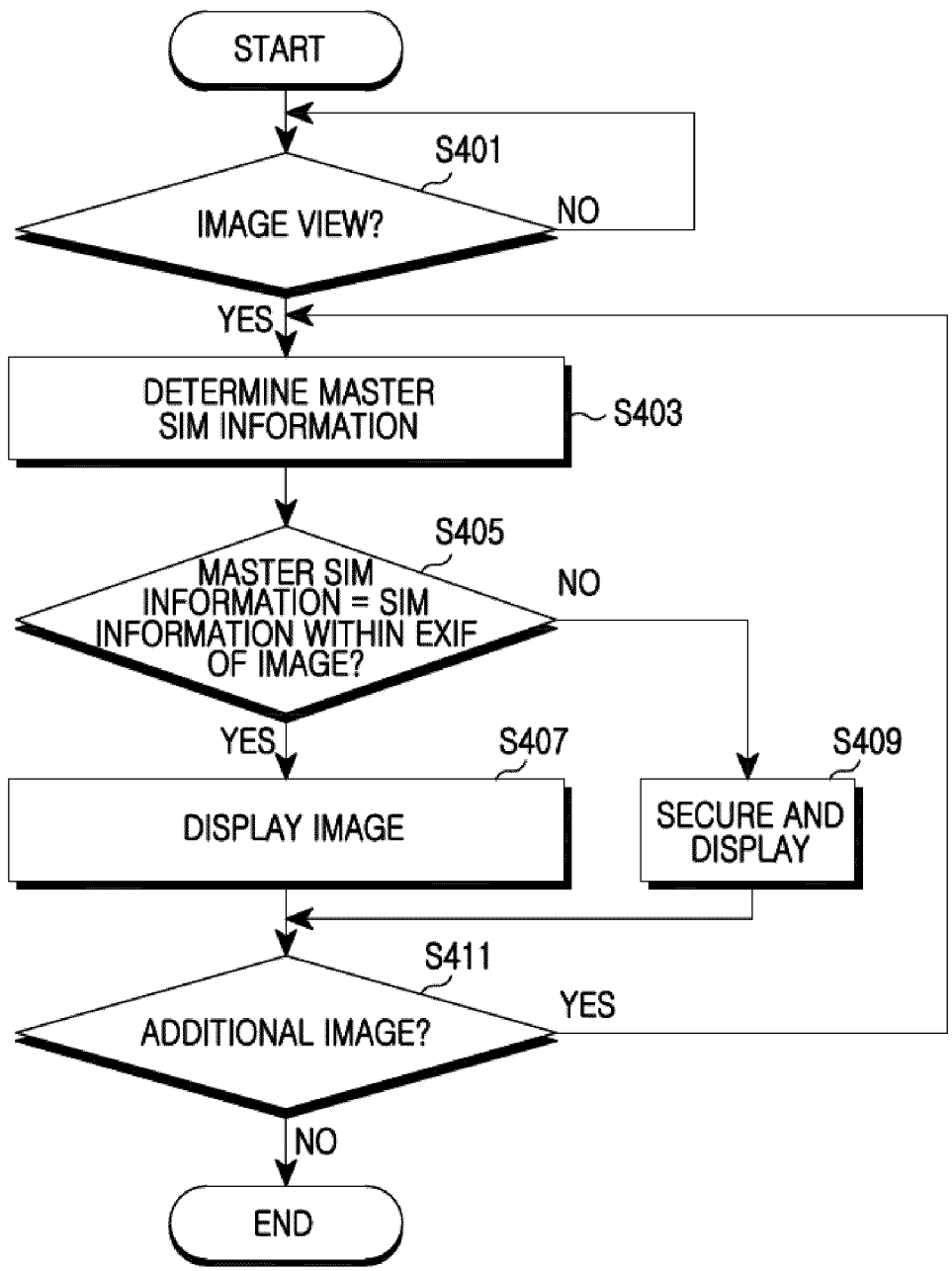
FIG. 4 is a flow diagram illustrating a procedure of displaying an image of a portable terminal according to an exemplary embodiment of the present invention.
Figure 5:
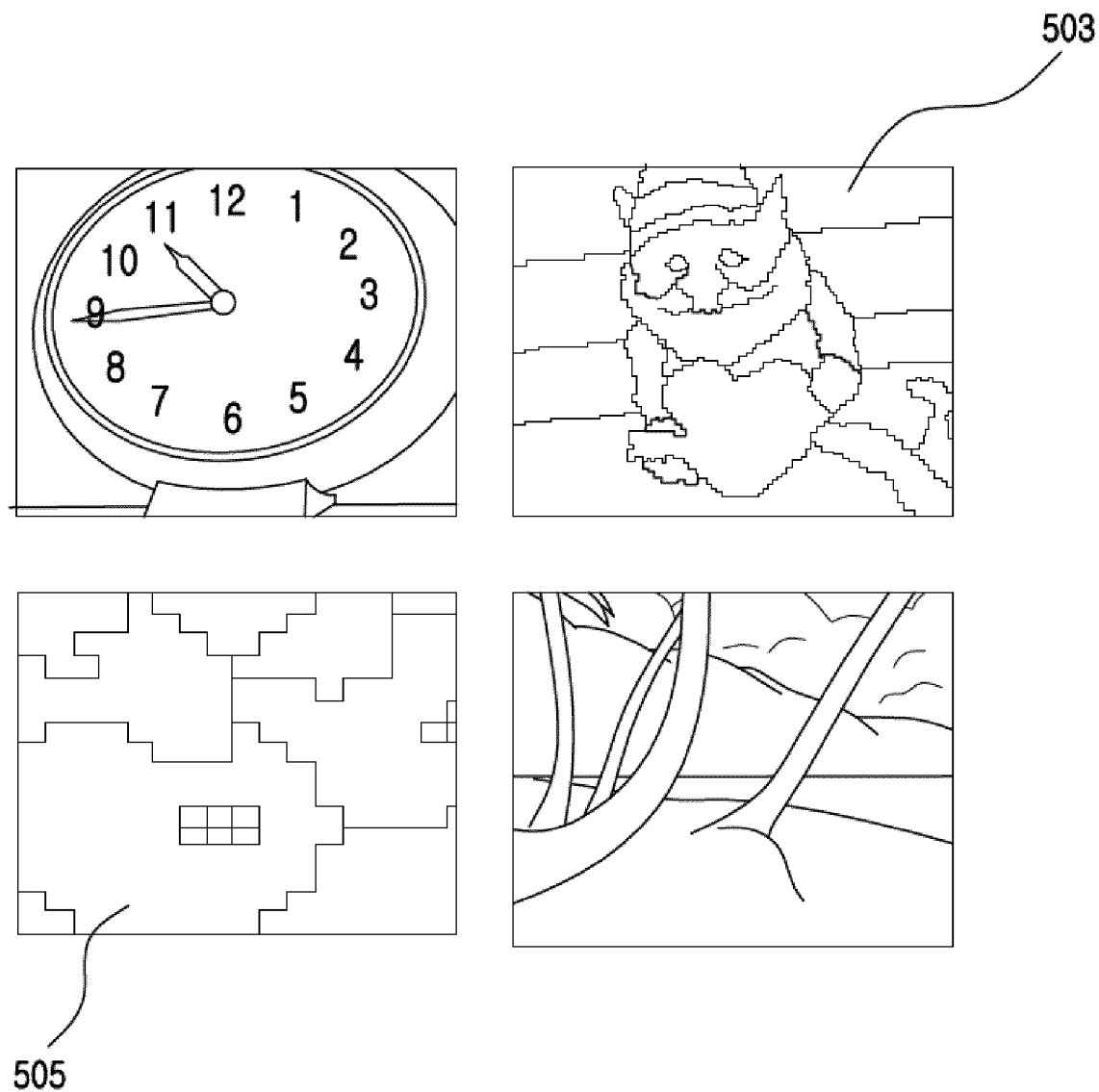
FIG. 5 is a diagram illustrating a displayed image of a portable terminal according to an exemplary embodiment of the present invention.

FIG. 4 is a flow diagram illustrating a procedure of displaying an image of a portable terminal according to an exemplary embodiment of the present invention. FIG. 5 is a diagram illustrating a displayed image of the portable terminal according to an exemplary embodiment of the present invention.

Referring to FIGS. 4 and 5, in step S401, the portable terminal determines if an event for a JPEG image view occurs.

If it is determined that the event for the JPEG image view occurs, the portable terminal proceeds to step S403 and determines information on a SIM mounted in the portable terminal. More particularly, according to an exemplary embodiment of the present invention, because the portable terminal, a dual mode portable terminal, can simultaneously use at least two SIM cards, the information on the SIM mounted in the portable terminal of step S403 is information on a master SIM 109A enabled.

Then, the portable terminal proceeds to step S405 and determines whether the SIM information determined in step S403 is substantially the same as SIM information within an EXIF of a JPEG image that is stored in a memory unit 107 of the portable terminal.

If it is determined that the SIM information determined in step S403 is substantially the same as the SIM information within the EXIF of the JPEG image stored in the memory unit 107 of the portable terminal, in step S407, the portable terminal displays the JPEG image. If it is determined that the SIM information determined in step S403 is different from the SIM information within the EXIF of the JPEG image stored in the memory unit 107 of the portable terminal, in step S409, the portable terminal secures and displays the secured JPEG image.

Securing the JPEG image is to make the JPEG image unclear as in FIG. 5. The image can be made indistinct 503 or mosaic 505. Also, although a user desires to select, magnify, and see the secured image, it is obvious that the image is unclear. Because there are conventional methods for basic image processing, a description of making indistinct 503 or making mosaic 505 is omitted for clarity and conciseness.

If SIM information within an EXIF of the secured image is substantially the same as information on a slave SIM 109B, the portable terminal may switch the slave SIM 109B and a master SIM 109A, change the slave SIM 109B into a master SIM after enabling the slave SIM 109B, and unsecure and display the JPEG image.

In an exemplary embodiment of the present invention, the portable terminal secures and displays a JPEG image in step S409. However, if the SIM information is different from each other in step S405, the portable terminal may not display the image without going through step S409.

After that, the portable terminal may determine whether there is an additional image in the memory unit 107 of the portable terminal in step S411. If it is determined that there is an additional image in the memory unit 107 of the portable terminal in step S411, the portable terminal returns to step S403. If it is determined that there is no additional image, the portable terminal terminates the procedure of displaying the image of the portable terminal according to an exemplary embodiment of the present invention.

As described above, the present invention can expect an effect that, by securing and displaying an image of a portable terminal, one portable terminal is used as if at least two portable terminals are used depending on a SIM and thus, can advantageously manage the image independently.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An image security method of a portable terminal, the method comprising:
   photographing an image through a camera;
   storing the image; and
   storing information of one Subscriber Identity Module (SIM) among at least two SIMs of the portable terminal in EXchangeable Image File (EXIF) information of the image,
   wherein the one SIM is used when photographing the image through the camera.

2. The method of claim 1, wherein the SIM information comprises inherent information for distinguishing from a different SIM, and comprises at least one of an International Mobile Subscriber Identification (IMSI), an Integrated Circuit Card IDentification (ICCID), and SIM Serial Number (SSN) Digits.

3. The method of claim 2, wherein the portable terminal comprises a dual mode portable terminal, and the SIM information comprises information on a master SIM enabled in the portable terminal.

4. The method of claim 1, wherein the storing of the image comprises storing a time when the photographing and storing of the image occurs, in a Joint Photographic Experts Group (JPEG) form.

5. The method of claim 1, wherein the storing of the image comprises compressing the image and storing the compressed image.

6. An image display method of a portable terminal, the method comprising:
   executing an image view;
   comparing Subscriber Identity Module (SIM) information of the portable terminal with SIM information within EXchangeable Image File (EXIF) information of an image stored in the portable terminal; and
   displaying an image depending on the comparison result.

7. The method of claim 6, wherein the SIM information comprises inherent information for distinguishing from a different SIM, and comprises at least one of an International Mobile Subscriber Identification (IMSI), an Integrated Circuit Card IDentification (ICCID), and SIM Serial Number (SSN) Digits.

8. The method of claim 7, wherein the portable terminal comprises a dual mode portable terminal, and the SIM information of the portable terminal comprises information on a master SIM enabled in the dual mode portable terminal.

9. The method of claim 8, wherein the displaying of the image comprises at least one of, if the comparison result is that the SIM information of the portable terminal is substantially the same as the SIM information of the EXIF information of the image stored in the portable terminal, displaying the image as it is and, if the comparison result is that they are not substantially the same, displaying a secured image.

10. The method of claim 6, further comprising:
    securing the image stored in the portable terminal.

11. The method of claim 9, wherein the securing of the image comprises making the image at least one of mosaic and indistinct to make the image unclear.

12. The method of claim 9, further comprising:
    if SIM information within an EXIF of a secured and displayed image is substantially the same as information on a slave SIM of the portable terminal, switching the slave SIM and a master SIM after activation of the slave SIM.

13. The method of claim 6, wherein the displaying of the image depending on the comparison result comprises, if the SIM information of the portable terminal is different from SIM information within EXchangeable Image File (EXIF) information of an image, not displaying any image.

14. A non-transitory computer-readable recording medium having recorded thereon a program for a portable terminal, the computer-readable recording medium comprising:
    a first code segment, for executing an image view;
    a second code segment, for comparing Subscriber Identity Module (SIM) information of a portable terminal with SIM information within EXchangeable Image File (EXIF) information of an image stored in the portable terminal; and
    a third code segment, for at least one of, if the comparison result is that the SIM information of the portable terminal is substantially the same as the SIM information of the EXIF information of the image stored in the portable terminal, displaying the image as it is and, if the comparison result is that they are not substantially the same, displaying a secured image.

15. A portable terminal for displaying an image display, the portable terminal comprising:
    means for executing an image view;
    means for comparing Subscriber Identity Module (SIM) information of the portable terminal with SIM information within EXchangeable Image File (EXIF) information of an image stored in the portable terminal; and
    means for displaying an image depending on the comparison result.

16. The portable terminal of claim 15, wherein the SIM information comprises inherent information for distinguishing from a different SIM, and comprises at least one of an International Mobile Subscriber Identification (IMSI), an Integrated Circuit Card IDentification (ICCID), and SIM Serial Number (SSN) Digits.

17. The portable terminal of claim 16, wherein the portable terminal comprises a dual mode portable terminal, and the SIM information of the portable terminal comprises information on a master SIM enabled in the dual mode portable terminal.

18. The portable terminal of claim 17, wherein the displaying of the image comprises at least one of, if the comparison result is that the SIM information of the portable terminal is substantially the same as the SIM information of the EXIF information of the image stored in the portable terminal, displaying the image as it is and, if the comparison result is that they are not substantially the same, displaying a secured image.

19. A portable terminal for securing image, the portable terminal comprising:
    means for photographing an image through a camera;
    means for storing the image; and
    means for storing information of one Subscriber Identity Module (SIM) among at least two SIMs of the portable terminal in EXchangeable Image File (EXIF) information of the image wherein the one SIM is used when photographing the image through the camera.

20. The portable terminal of claim 19, wherein the SIM information comprises inherent information for distinguishing from a different SIM, and comprises at least one of an International Mobile Subscriber Identification (IMSI), an Integrated Circuit Card IDentification (ICCID), and SIM Serial Number (SSN) Digits.

* * * * *